United States Patent [19]

Matz

[11] Patent Number: 5,074,169
[45] Date of Patent: Dec. 24, 1991

[54] BRAIDED SHIELD REMOVAL

[75] Inventor: Leon S. Matz, Mesa, Ariz.

[73] Assignee: McDonnell Douglas Helicopter Company, Mesa, Ariz.

[21] Appl. No.: 566,973

[22] Filed: Aug. 14, 1990

[51] Int. Cl.$^5$ .............................................. H02G 1/12
[52] U.S. Cl. ................................................... 81/9.51
[58] Field of Search ....................... 81/9.51, 9.41, 9.42, 81/9.43

[56] References Cited

U.S. PATENT DOCUMENTS

| | | |
|---|---|---|
| 2,573,497 | 10/1951 | Rupert . |
| 2,929,285 | 3/1960 | Gulemi . |
| 2,989,940 | 6/1961 | Folkenroth et al. . |
| 3,044,333 | 7/1962 | Broske . |
| 3,044,334 | 7/1962 | Broske . |
| 3,139,778 | 7/1964 | Bielinski et al. . |
| 3,153,358 | 10/1964 | Havens . |
| 3,171,306 | 3/1965 | Mirsch . |
| 4,914,986 | 4/1990 | Masaki . |

FOREIGN PATENT DOCUMENTS 1349520 12/1963 France .
54-68993 6/1979 Japan .

OTHER PUBLICATIONS

IBM Technical Disclosure Bulletin, article entitled "Mechanical Wire Stripper", by D. E. Shaw, vol. 4, No. 12, May 1962, p. 15.
"A Tool for Stripping Multiconductor Leads", David E. Lewis, Stamford University, Jun. 8, 1988.

Primary Examiner—D. S. Meislin
Attorney, Agent, or Firm—Donald E. Stout; Gregory A. Cone; John P. Scholl

[57] ABSTRACT

An apparatus for removing the metal wire braid shielding from jacketed electrical wire. It uses a male/female die set and avoids moving the wire braid while cutting. A carousel is provided which readily accommodates different wire sizes.

13 Claims, 5 Drawing Sheets

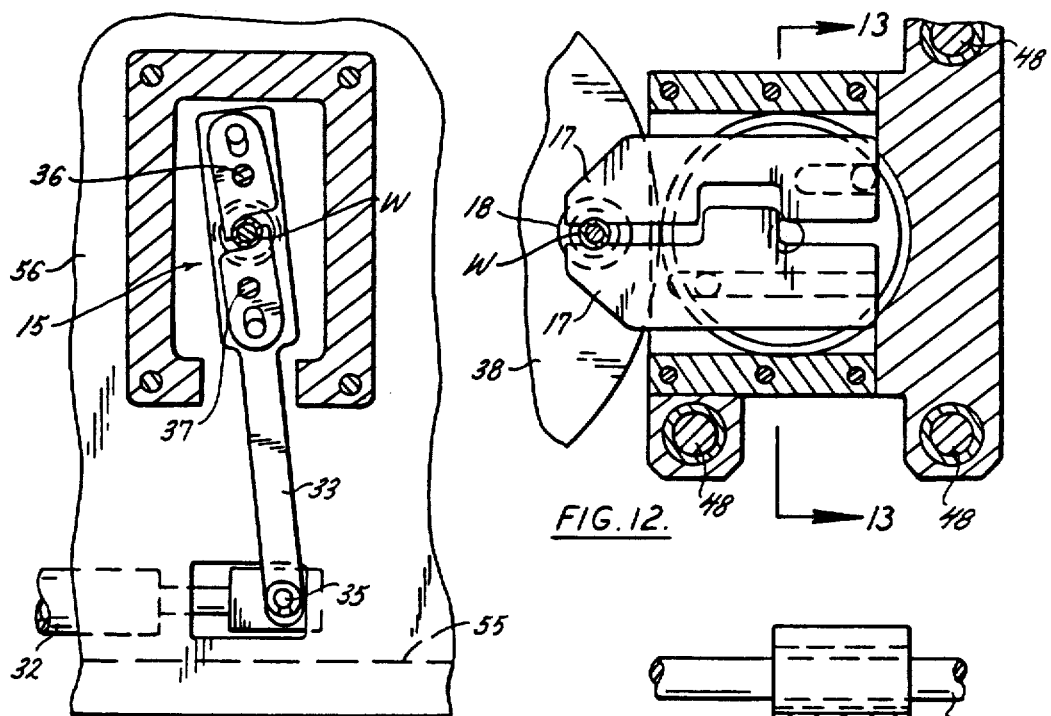
FIG. 11.
FIG. 12.
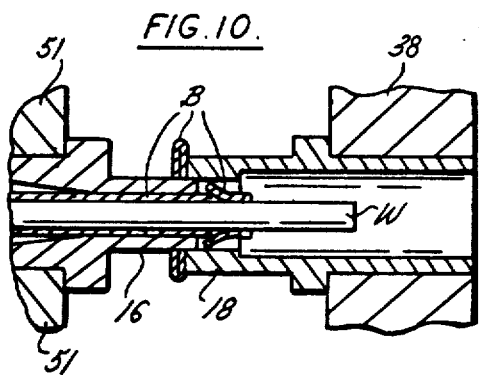
FIG. 10.
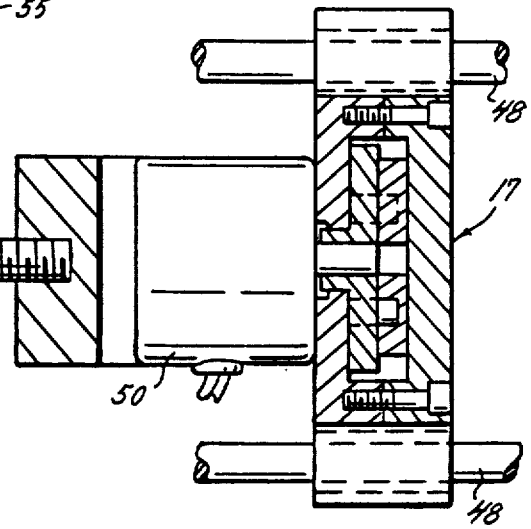
FIG. 13.
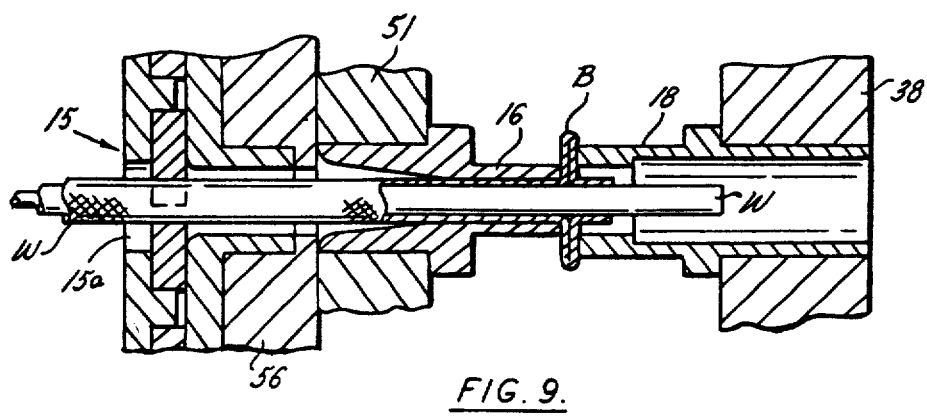
FIG. 9.

BRAIDED SHIELD REMOVAL

BACKGROUND OF THE INVENTION

The subject invention relates to a wire stripper and more particularly to a wire stripper for stripping braided wire from around an electrical cable and specifically to a wire stripper for stripping wire braid from around one end of a shielded cable.

Some of the prior art teaches shielded wire stripping through use of male/female punch die sets which are designed to cut the braid so as to avoid pressure contact between the opposing cutting edges of the die. The prior art also teaches a moveable gripper to bunch the braid in an enlarged flattened donut before cutting the braid. However, in all of the known wire braid strippers of the prior art the moving gripper continues to move the wire shield during the process of cutting or closing of the die. This results in pulling the wire braid over the cutting edges of the die so that the wire braid tends to tear rather than cut and it unduly dulls the dies. Although there are many other features which distinguish this invention over the prior art, e.g. the indexing carousel to hold the opposing die set members for ease in accommodating different wire sizes, the most critical distinction is to avoid forcefully moving the braid while the die set closes. Problems with automated wire braid removal are particularly exaggerated with twisted multiple-conductor, metallic shielded, jacketed wire which is generally elliptical in cross-section and the twisted strands form a helix.

It is an object of this invention to remove the metal wire braid shielding from jacketed electrical wire with a clean cut of the braid while insuring a long life for the cutting means.

It is a further object of this invention to provide a wire braid removal apparatus which is readily adaptable, with a minimum effort, to accommodate different wire diameter sizes and readily adjustable for the length of wire braid removed from the end of the wire.

It is yet a further object of this invention to produce a semi-automatic apparatus.

SUMMARY OF THE INVENTION

Briefly, and in general terms, the present invention provides both an apparatus and a method for removing the metal wire braid shielding from jacketed electrical wire. The wire from which the braided shielding is to be removed is inserted through the generally axially aligned opening of the first gripper, which is stationary, the apertures of the first and second halves of the spaced punch die set, the second half of which is axially moveable, and finally, the second gripper. The second gripper is also axially moveable, has means to so move it and further means are provided which permit the second half of the die to move, unimpeded by the second gripper, when the second gripper is open. Means are also provided to close the die set. Of course, in its simplest form, all of the moving means can be provided by the operators hands. However, in the preferred embodiment the apparatus is semi-automatic and much more complex than the simplest form which will be discussed infra. Thus, again in its simplest form, the method or process of removing the braid from the wire is begun by inserting the wire in the apparatus as noted above. The first gripper is closed, firmly holding the wire. The second half of the die set is then moved away from the first gripper so as to move past the second gripper and the combination accommodates this passage. The second gripper is then closed and moved towards the first gripper, bunching the wire braid in the process so as to form an enlarged, flattened donut of wire braid against the first half of the die set. The second gripper is then released and thereby opened so that the second half of the die set can close against the first half with the bunched braid in between and, as a result, severed. It is important to note that the second gripper is released and there are no other forces acting on the wire braid other than the forces of the two halves of the die set at the time of severence. The first gripper is then released and the wire removed from the apparatus and the severed donut of braid readily falls off and any braid between the severed donut portion and the end of the wire slips off quite easily.

In the preferred embodiment the apparatus is more complex and, therefore, more steps are added to the method of removing the braided shielding from the electrical wire. A carousel is provided which supports multiple sets of the spaced male/female punch die sets, each set in axial alignment, and located on a circle about its axis of rotation. The carousel is mounted on an axis generally parallel to the common axis of the grippers and die sets described in the simplest form of the apparatus above and into which the wire is inserted. The two parallel axes are mounted on a support so that the radius of the circles locating the two halves of the punch die sets coincide with the aligned axis of the two grippers so that rotation of the carousel allows you to select the proper die set for the wire size required. The carousel axially fixes the first half of the die set and means are provided for sliding the second half of the die set as discussed above. In other words, the carousel can hold as many die sets as the circumference of the carousel at the location of the die sets permits. Means, e.g. a pneumatic cylinder or equivalent for axially moving the second half of the die set either away from the first gripper to allow for bunching of the braid or towards the first gripper when cutting the braid are provided as discussed above. The apparatus may use a programmable logic controller to activate and control the various actuators to insure the proper sequence of events. The software program to control the various actuators resides in an E-PROM within the controller. An electronic sensor tells the controller that a wire has been inserted in the device and the wire further initiates a switch which activates the controller to begin the sequence of events.

BRIEF DESCRIPTION OF THE DRAWINGS

With reference to the drawings, wherein like reference numbers designate like portions of the invention:

FIG. 9 is another enlarged view similar to FIG. 8 except the second gripper is shown in the open position and the female portion of the die set is closing;

FIG. 10 shows the same view after the die cuts the braid;

FIG. 11 is a section view showing an enlarged view of a portion of FIG. 3 wherein the first gripper is in the closed or clamped position;

FIG. 12 is a section view through the second gripper shown in the clamped position; and FIG. 13 is a section through the section view of FIG. 12;

DESCRIPTION OF THE PREFERRED EMBODIMENT

Figure 1:
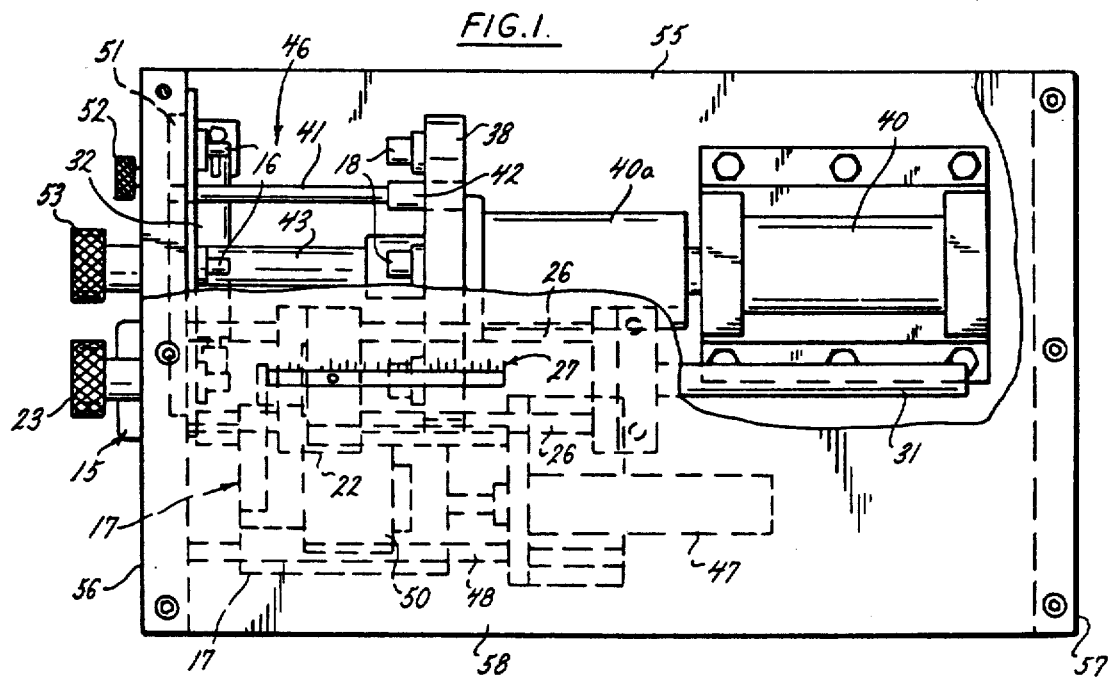
FIG. 1 is a top view of the device with a portion of the top cover cut away to better show the carousel.
Figure 2:
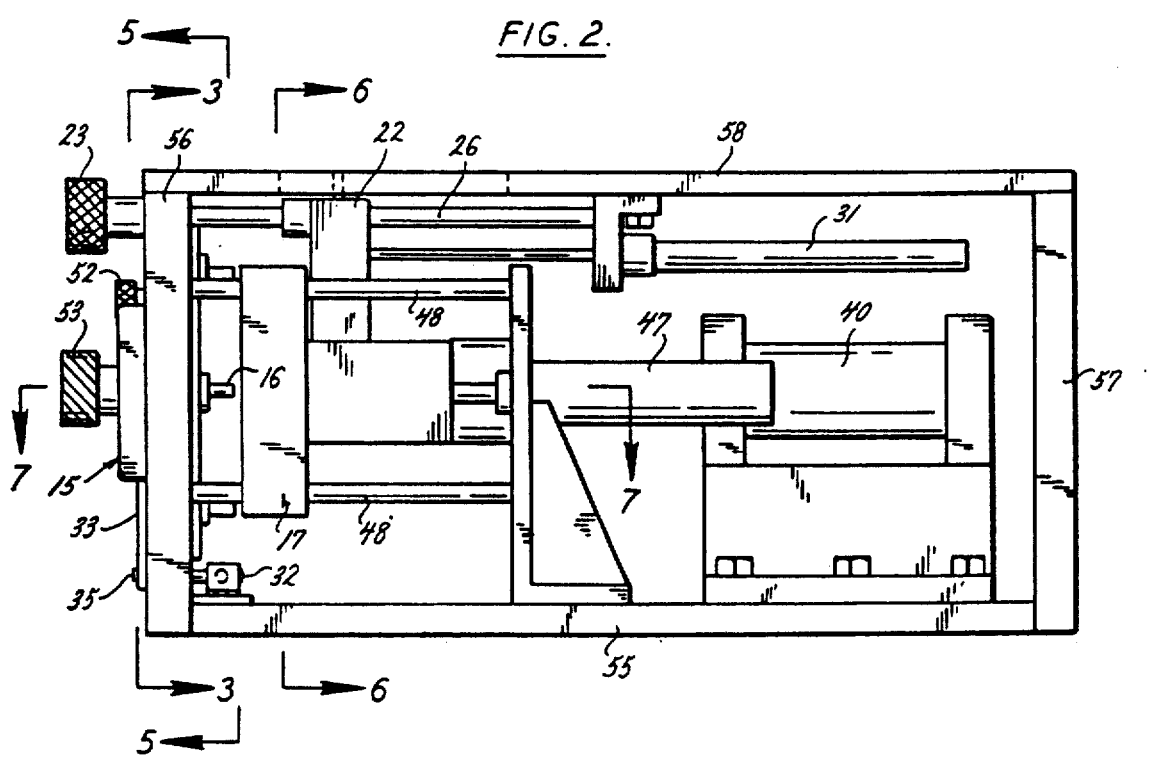
FIG. 2 is a side view of the view shown in FIG. 1.
Figure 4:
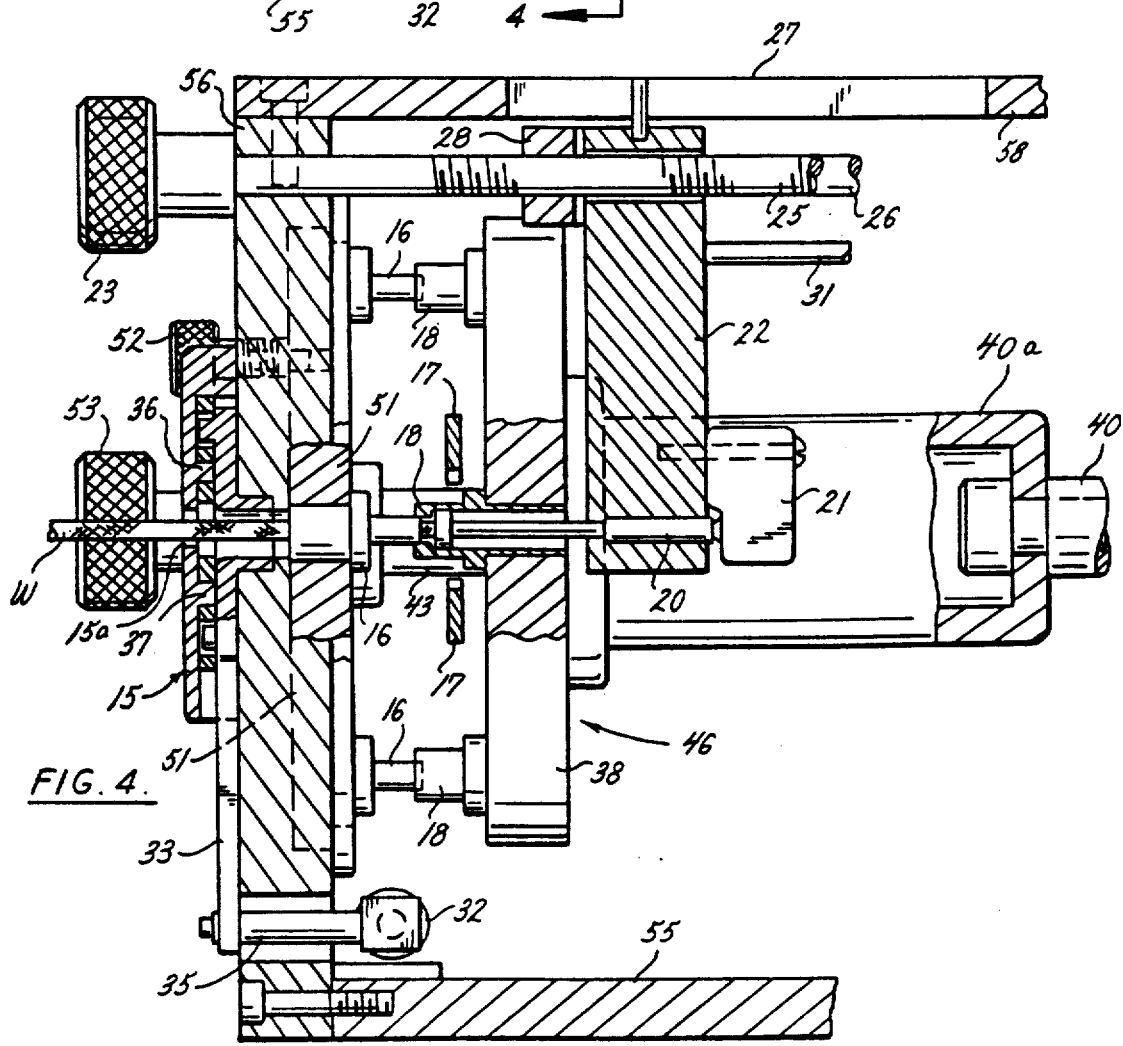
FIG. 4 is a section view cut as shown in FIG. 3 of the front portion of the apparatus.
Figure 5:
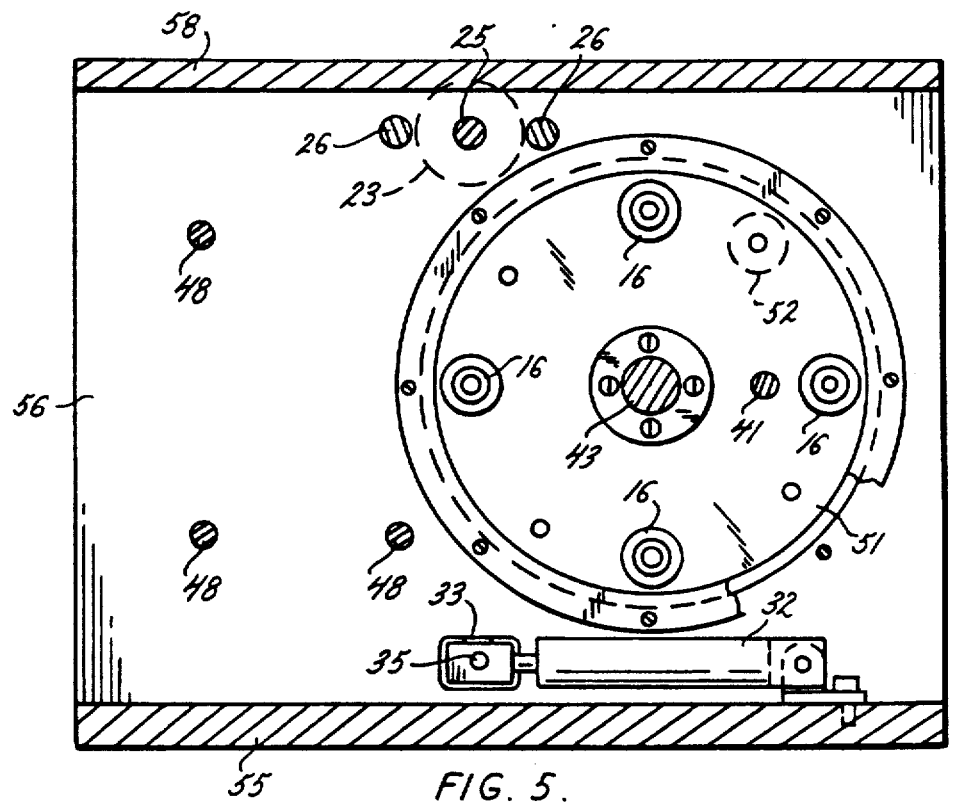
FIG. 5 is a section cut as shown in FIG. 2.

FIGS. 1 and 2 are top and side views, respectively, showing the overall apparatus. The balance of the figures are section views and better show the mechanics of the invention. The braid shielded wire W is inserted through the aperture 15a of the first gripper 15, the central aperture in the male half of the die 16, second gripper 17 and the female die half 18. This is best seen in FIG. 4. The inserted end of the wire is shown butting up against the sensor 20 which in turn engages the electrical switch 21 all of which is supported by the sensor support 22. The position of the sensor support 22 is adjustable in order to control and predetermine the amount of wire braid to be removed. The adjustment occurs by turning knob 23 which is connected to a threaded rod 25 which in turn engages a female thread in the stop 28 and a clearance hole in the sensor support 22. The sensor support 22 is further supported by two rods 26. The length of the wire braid removed is adjusted by use of the scale 27 shown in FIG. 1.

FIG. 4 shows the wire W in the initiating position with the die set 16 and 18 in the closed position and the wire engaging the sensor 20 which in turn initiates the switch 21. The switch 21, in turn, initiates a programmable logic controller (not shown) one of several alternate, well known in the art, means for controlling a sequence of events.

As previously discussed, stop 28 simply stops the forward traverse of sensor support 22 which slides on the rods 26 and the oversize hole 30 clears the threaded rod 25. Sensor support 22 is moved by the air cylinder 31.

Figure 3:
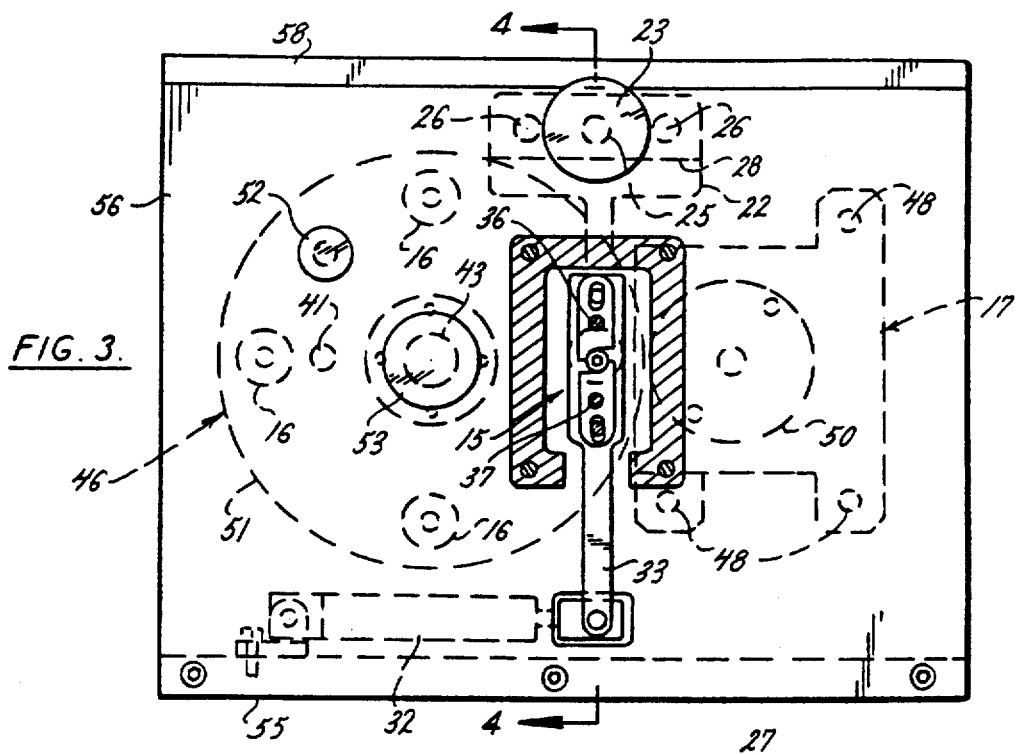
FIG. 3 is a section view cut as shown in FIG. 2 cutting through a portion of the first gripper and its support.

Insertion of the wire to trigger the switch 21 closes the first gripper 15 by actuation of the air cylinder 32 which is best shown in the section view of FIG. 3. Extension of the piston rod of the cylinder 32 moves the lever 33 which is attached to the piston by connector 35. Extension of the piston rod moves the lever 33 which in turn rotates the two halves of the gripper 15 about the pins 37 and 36 to grip the wire W. This gripper engages with substantial force so that the wire and braid cannot move as a result of the subsequent operations. This action is best shown in FIG. 11. The next sequential operation is to move the female die support 38 rearward on the rod 41 via the sliding bushing 42 and the shaft 43 and the bushing 45 all of which are best shown in the upper portion of FIG. 7 wherein the support 38 is shown in the rearward position.

The carousel 46, which adapts alternate die sizes to accommodate different size wire, will be explained in detail infra as it is not essential to the wire braid removal process.

The second gripper 17 or bunching jaws is moved to the rearward position by the air cylinder 47 by sliding the second gripper 17 on the pair of rods 48. The second gripper 17 is then actuated by the rotary actuator 50 to clamp the wire W as shown in FIG. 12 in the clamped position and the open position in FIG. 6. FIG. 13 shows the rotary actuator and the second gripper 17 in a side view. The second gripper 17 must have an open position which allows for the free movement of the female die half 18 through the open jaws of the gripper and must have a somewhat sensitive gripping control because if it grips too strongly it will interfere with the sliding of the wire shielding braid in the next sequential step.

Figure 6:
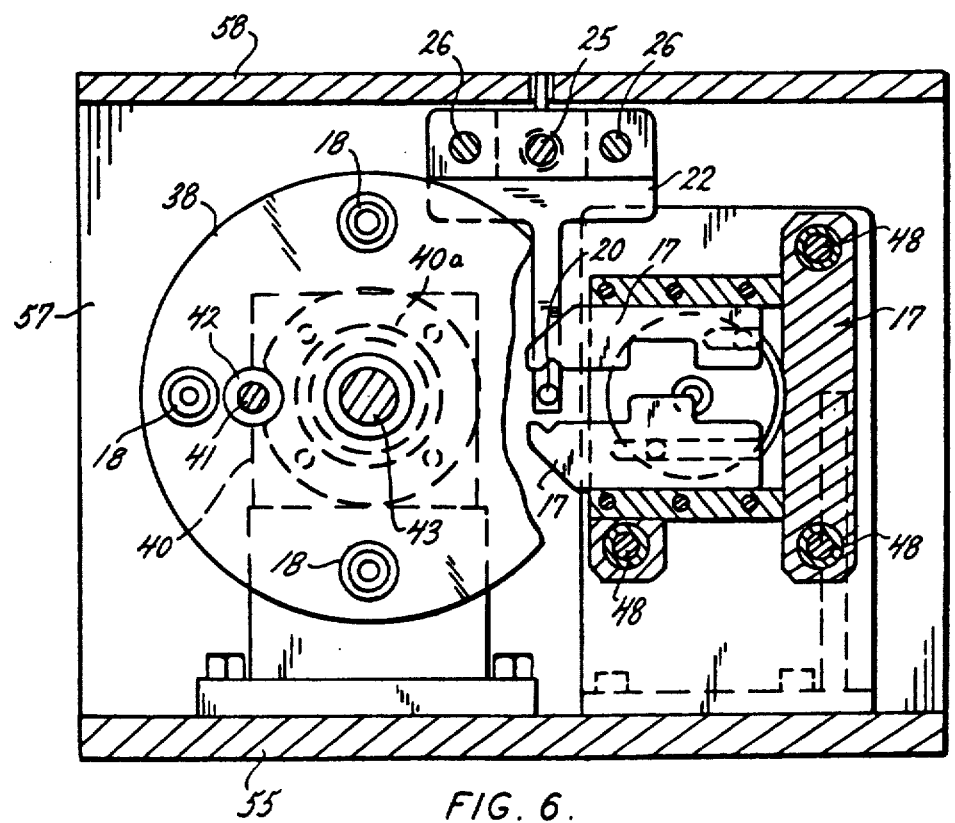
FIG. 6 is a cut, also as shown in FIG. 2, primarily showing the second gripper.
Figure 7:
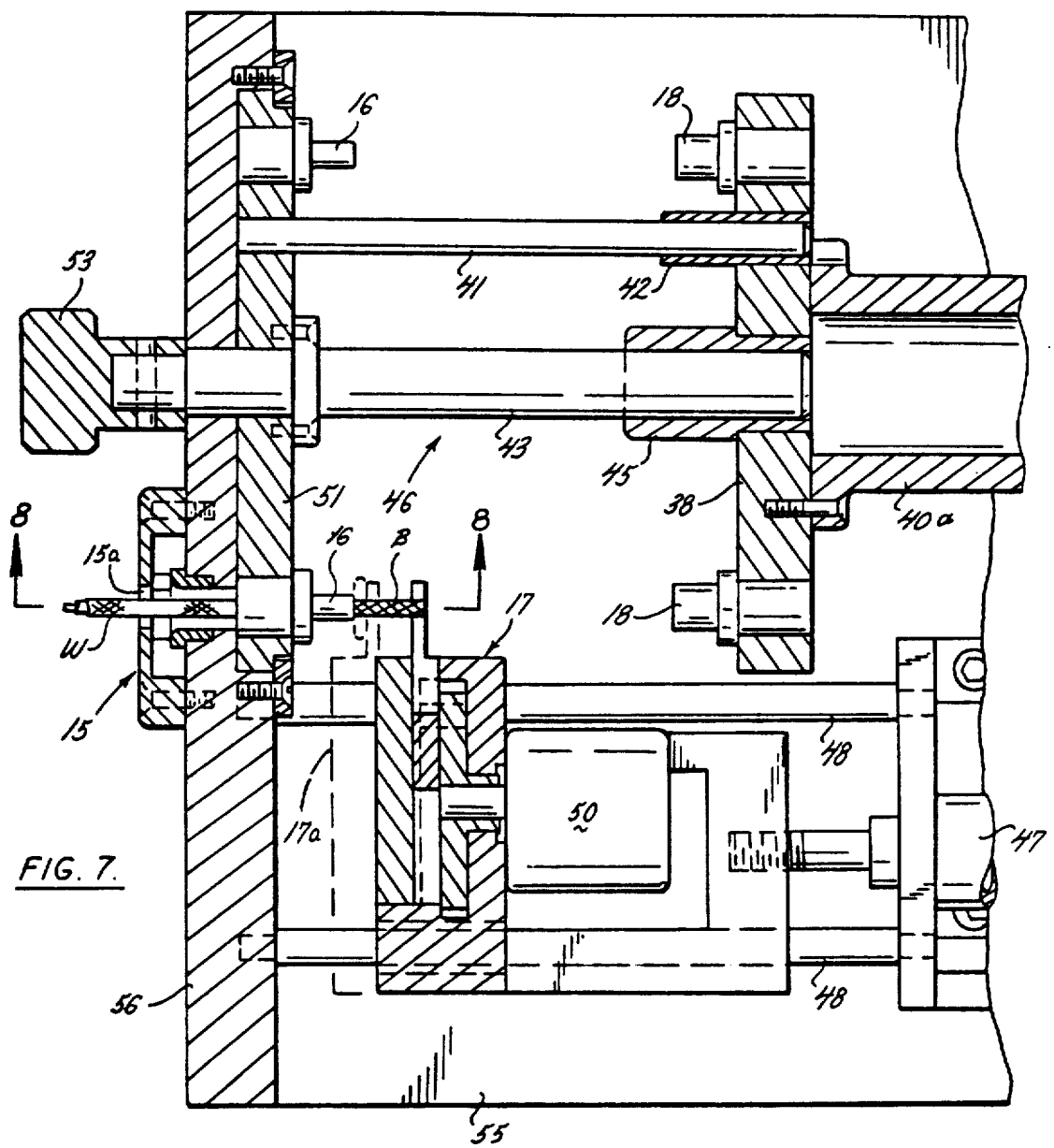
FIG. 7 is a down looking cut through a portion of FIG. 2 showing: the die set in the fully retracted posi
Figure 8:
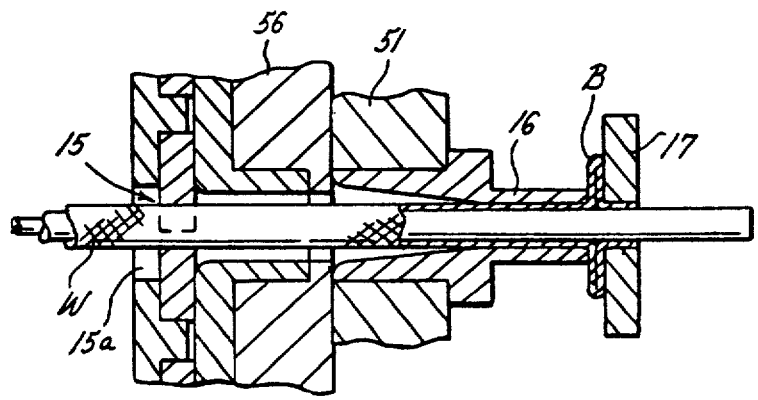
- FIG. 8 is an enlarged view of a section through a portion of FIG. 7 showing the second gripper with the braid in the full bunched position against the first half of the die set.

After the wire W is gripped by the second gripper 17, air cylinder 47 is again activated to move forward, thus bunching the braided shield against the cutting punch or male half of the die 16 as shown in the phantom lines of FIG. 7 and in the enlarged view of FIG. 8. The second gripper or bunching jaws are then opened by actuating the rotary actuator 50 in the position as shown in FIG. 6. Air cylinder 40 is now actuated to move the female die half 18 forward, through the open jaws of the second gripper 17 past the male half 16 of the die set thereby cutting off the bunched wire braid as shown in FIGS. 9 and 10 in the engaging and cut-off positions respectively. As can be seen in FIG. 10 the bunched up portion of the braid is cut cleanly leaving a short sleeve of wire braid about the remaining wire W. After completing the circular cut the female die support 38 moves completely to the rear leaving the cut braid on the exposed wire. The air cylinder 32 is then retracted releasing the wire W from the first gripper 15 the wire W is now readily removable and the severed wire braid easily removable. Removal of the wire tells the sensor that the wire is no longer present and resets the machine for the next operation.

Now to the carousel 46 which is best shown in the upper portion of FIG. 7. The carousel is used simply to readily adapt the shielding wire stripper to various wire sizes. As shown, male and female die sets, 16 and 18 respectively are shown at 90° locations on their respective supports. However, the number of wire sizes that can be accommodated is only limited by the space available on the circular center line of the die sets. The opposing female die support 38 and the male die support 51 must remain indexed relative to each other so that the die sets always match so that to change wire size the two supports 38 and 51 must be rotated together. The supports are radially aligned and locked in place by the locking pin 52, the indexing rod 41 and the shaft 43. In order to change the die set to accommodate a different size wire the locking pin 52 is released and the knob 53 rotated so that the proper die set 16 and 18 aligns with the apertures of the first and second grippers 15 and 17 respectively.

Simply to hold the various elements of the apparatus together there is provided a base plate 55, front and rear plates 56 and 57 and a cover plate 58 suitably fastened together and having brackets etc. to support the various elements.

It should now be well recognized that the first gripper 15 holds the wire in a fixed position with relationship to all of the other elements of the device. The second gripper 17 must open wide enough to accommodate through movement of the female die half 18 so as to cut the wire braid while the second gripper is released. This feature of the invention insures a clean cut of the wire braid while insuring a long life of the cutting means. Also, the carousel arrangement of the die sets accommodates the change in wire size with minimum effort.

Certain exemplary embodiments of this invention have been described above and are shown in the accompanying drawings. It is to be understood that such embodiments are merely illustrative of, and not restrictive on, the broad invention. It is not intended to limit the invention to these specific arrangements, constructions or structures described or shown, for various modifications thereof may occur to persons having ordinary skill in the art.

What is claimed is:

1. An apparatus for removing the metal wire braid shielding from jacketed electrical wire, comprising:
   a base;
   a first gripper, supported from said base, and adapted to receive and grip said electrical wire;
   a first half of a punch die set generally aligned with and fixed in the transverse direction with respect to said first gripper;
   a second half of a punch die set aligned with and axially moveable with respect to said first half of the punch die set;
   a second gripper axially moveable, generally aligned with said punch die set, supported from said base and having a first means to allow said second half of said punch die set to move transversely past said second gripper and a second means to grip said wire braid and allow said wire braid to slide and bunch when moved axially with said first gripper in said grip position; and
   means to axially move said second half of said die set, past said second gripper and to close said die set whereby to cut-off said bunched wire braid.

2. The apparatus as set out in claim 1 wherein said first and second means is a gripper having an open position which allows said second half of said punch die set to move transversely through said open grip position and a closed position which allows said wire braid to slide and bunch when moved axially with said first gripper in said grip position.

3. The apparatus as set out in claim 1 further comprising means to automatically actuate said first gripper, axially move said second half of said punch die set fore and aft and open and close said second gripper in a pre-determined automatic sequence.

4. The apparatus as set out in claim 2 further comprising means to automatically actuate said first gripper, axially move said second half of said punch die set fore and aft and open and close said second gripper in a pre-determined automatic sequence.

5. The apparatus as set out in claim 1 wherein said punch die set is at least first and second die sets supported on a carousel further comprising:
   a first punch plate adapted for rotation about a central axis and supporting said first half of said first punch die set at a given radius from said axial center;
   a second punch plate aligned with said first punch plate axial center, axially displaceable with respect to said first punch plate, adapted for rotation with said first punch plate and supporting said second half of said first punch die set at said given radius from said axial center;
   said carousel mounted on said base with said central axis parallel to and spaced from, said alignment axis of said first and second gripper so that a circle drawn from said central axis with said predetermined radius always maintains a point on said circle that aligns with said alignment axis;
   said at least second die set mounted with said first and second die halves in alignment, in said circle and radially displaced from said first die set;
   means to lock said carousel in a fixed radial position when one of said die sets aligns with said alignment axis; and
   wherein, said means to axially move said second half of said die set is means to move said second punch plate supporting said second half of said die set.

6. The apparatus as set out in claim 2 wherein said punch die set is at least first and second die sets supported on a carousel further comprising:
   a first punch plate adapted for rotation about a central axis and supporting said first half of said first punch die set at a given radius from said axial center;
   a second punch plate aligned with said first punch plate axial center, axially displaceable with respect to said first punch plate, adapted for rotation with said first punch plate and supporting said second half of said first punch die set at said given radius from said axial center;
   said carousel mounted on said base with said central axis parallel to and spaced from, said alignment axis of said first and second gripper so that a circle drawn from said central axis with said predetermined radius always maintains a point on said circle that aligns with said alignment axis;
   said at least second die set mounted with said first and second die halves in alignment, in said circle and radially displaced from said first die set;
   means to lock said carousel in a fixed radial position when one of said die sets aligns with said alignment axis; and
   wherein, said means to axially move said second half of said die set is means to move said second punch plate supporting said second half of said die set.

7. The apparatus as set out in claim 3 wherein said punch die set is at least first and second die sets supported on a carousel further comprising:
   a first punch plate adapted for rotation about a central axis and supporting said first half of said first punch die set at a given radius from said axial center;
   a second punch plate aligned with said first punch plate axial center, axially displaceable with respect to said first punch plate, adapted for rotation with said first punch plate and supporting said second half of said first punch die set at said given radius from said axial center;
   said carousel mounted on said base with said central axis parallel to and spaced from, said alignment axis of said first and second gripper so that a circle drawn from said central axis with said predetermined radius always maintains a point on said circle that aligns with said alignment axis;
   said at least second die set mounted with said first and second die halves in alignment, in said circle and radially displaced from said first die set;
   means to lock said carousel in a fixed radial position when one of said die sets aligns with said alignment axis; and wherein, said means to axially move said second half of said die set is means to move said second punch plate supporting said second half of said die set.

8. The apparatus as set out in claim 4 wherein said punch die set is at least first and second die sets supported on a carousel further comprising:
a first punch plate adapted for rotation about a central axis and supporting said first half of said first punch die set at a given radius from said axial center;
a second punch plate aligned with said first punch plate axial center, axially displaceable with respect to said first punch plate, adapted for rotation with said first punch plate and supporting said second half of said first punch die set at said given radius from said axial center;
said carousel mounted on said base with said central axis parallel to and spaced from, said alignment axis of said first and second gripper so that a circle drawn from said central axis with said predetermined radius always maintains a point on said circle that aligns with said alignment axis;
said at least second die set mounted with said first and second die halves in alignment, in said circle and radially displaced from said first die set;
means to lock said carousel in a fixed radial position when one of said die sets aligns with said alignment axis; and
wherein, said means to axially move said second half of said die set is means to move said second punch plate supporting said second half of said die set.

9. The apparatus as set out in claim 1 further comprising means to adjust the length of said wire braid removed from the end of said electrical wire.

10. The apparatus as set out in claim 2 further comprising means to adjust the length of said wire braid removed from the end of said electrical wire.

11. The apparatus as set out in claim 3 further comprising means to adjust the length of said wire braid removed from the end of said electrical wire.

12. The apparatus as set out in claim 4 further comprising means to adjust the length of said wire braid removed from the end of said electrical wire.

13. An apparatus for removing the metal wire braid shielding from jacketed electrical wire, comprising:
a base;
a first gripper, supported from said base, and adapted to receive and mechanically grip said electrical wire;
at least two punch die sets, each set having a first half and a second half;
a carousel supporting said at least first and second die sets further comprising:
a first punch plate adapted for rotation about a central axis and supporting said first half of said first punch die set at a given radius from said axial center;
a second punch plate having an axial center aligned with said first punch plate axial center, axially displaceable with respect to said first punch plate, adapted for rotation with said first punch plate and supporting said second half of said first punch die set at said given radius from said axial center;
a second gripper axially moveable, generally aligned on an alignment axis with said first gripper, supported from said base and having a first means to allow said second half of said punch die set to traverse past said second gripper and grip said wire braid so as to allow said wire braid to slide and bunch when moved axially with said first gripper in said grip position;
said carousel mounted on said base with said central axis parallel to and spaced from, said alignment axis of said first and second gripper so that a circle drawn from said said central axis with said predetermined radius always maintains a point on said circle that aligns with said alignment axis;
said at least second die set mounted with said first and second die halves in alignment, in said circle and radially displaced from said first die set;
means to lock said carousel in a fixed radial position when one of said die sets aligns with said alignment axis; and
means to move said second punch plate supporting said second half of said die set.

* * * * *